R. D. NORTON.
Pulverizing Disk Harrow.
No. 214,180. Patented April 8, 1879.
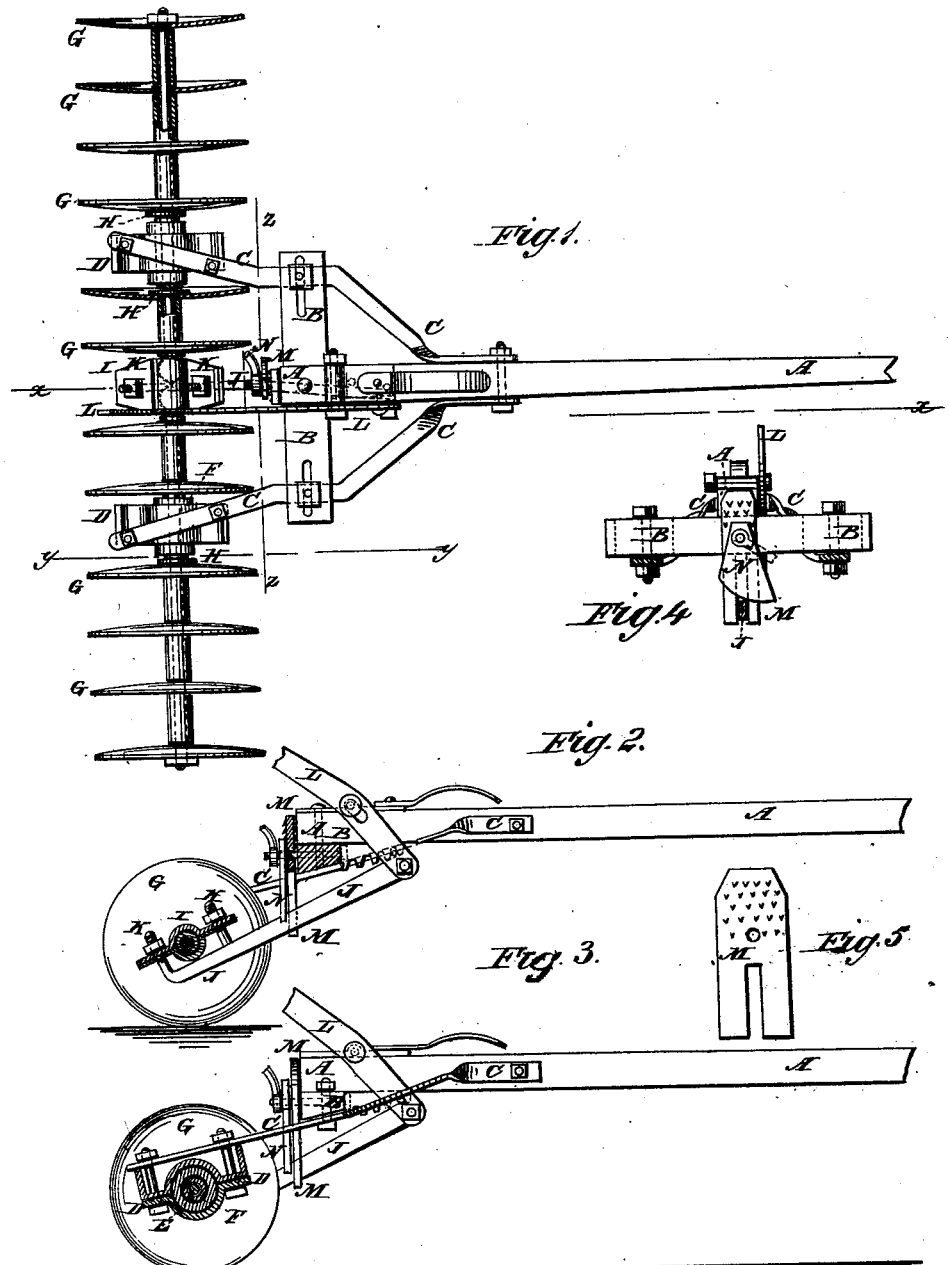

UNITED STATES PATENT OFFICE.

RICHARD D. NORTON, OF NEW SHARON, NEW JERSEY.

IMPROVEMENT IN PULVERIZING DISK-HARROWS.

Specification forming part of Letters Patent No. 214,180, dated April 8, 1879; application filed January 16, 1879.

*To all whom it may concern:*

Be it known that I, RICHARD D. NORTON, of New Sharon, in the county of Monmouth and State of New Jersey, have invented a new and useful Improvement in Pulverizing Disk-Harrows, of which the following is a specification.

Figure 1 is a top view of the harrow, partly in section, to show the construction. Fig. 2 is a side view of the same, partly in section, through the line $x\, x$, Fig. 1. Fig. 3 is a side view of the same, partly in section, through the line $y\, y$, Fig. 1. Fig. 4 is a cross-section of the same, taken through the line $z\, z$, Fig. 1. Fig. 5 is a detail view of the slotted button.

Similar letters of reference indicate corresponding parts.

The object of this invention is to improve the construction of the pulverizing disk-harrow in such a way that it may be more easily held and controlled, and at the same time may be more durable and effective.

The invention consists in a double bearing, combined with a bar secured at the rear end by two bolts and pivoted to the lower end of a hand-lever, and in the combination of a cam and slotted button with a flattened holding-bar, all as hereinafter described.

A represents the tongue to which the draft is applied.

To the lower side of the rear end of the tongue A is attached a cross-bar, B, the outer ends of which are slotted to receive the bolts by which the bars C are secured to them. The forward ends of the bars C are bolted to the opposite sides of the tongue A, and their rear ends are bolted to the bearings D, in which the shafts E revolve, a bushing, F, being placed upon the said shafts within the bearings D to receive the wear.

Upon the shafts E, between the ends of the bearings D and the disks G, are placed washers H, to lessen the friction and prevent the said disks from being worn by the said ends of the bearings.

The inner ends of the shafts E are pivoted to a bearing, I, with ball-and-socket joints, so that the two shafts E may be adjusted in line, or at an angle with each other, as may be desired.

The double bearing I is held in place by a bar, J, the rear end of which is secured to it by two bolts, K, which pass through the said bearing and are formed upon or are attached to the said bar J.

The forward end of the holding-bar J is pivoted to the lower end of a lever, L, which is pivoted to the tongue A. The lever L is held in any position into which it may be adjusted by a projection attached to it, and which engages with the notched edge of a plate attached to the tongue.

The holding-bar J is made flat vertically, and passes through a slot in the button M, which is bolted to the cross-bar B at the rear end of the tongue A.

The two bolts K cause the bar J to hold the bearing I firmly and keep it securely in place. The slotted button M holds the bar J from turning or twisting, and thus causes the harrow to work more satisfactorily.

N is a cam-button, which is placed upon the bolt that secures the slotted button M, and is clamped against the said button by the nut of the said bolt.

By this construction, by adjusting the cam-button N, the rise of the holding-bar J and of the middle part of the harrow may be limited to any desired point.

Having thus described my invention, I claim as new and desire to secure by Letters Patent—

1. The combination of the slotted button M with the flattened holding-bar J, and with the tongue A and cross-bar B of the harrow, substantially as herein shown and described.

2. The combination of the cam-button N with the slotted button M and the flattened holding-bar J, substantially as herein shown and described.

RICHARD D. NORTON.

Witnesses:
JAMES T. GRAHAM,
O. SEDGWICK.